(12) United States Patent
Chinniah et al.

(10) Patent No.: US 7,618,160 B2
(45) Date of Patent: Nov. 17, 2009

(54) NEAR FIELD LENS

(75) Inventors: Jeyachandrabose Chinniah, Belleville, MI (US); Jeff C. Lin, Novi, MI (US); Christopher L. Eichelberger, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 236 days.

(21) Appl. No.: 11/752,801

(22) Filed: May 23, 2007

(65) Prior Publication Data

US 2008/0291683 A1 Nov. 27, 2008

(51) Int. Cl.
*F21V 5/00* (2006.01)
*G02B 3/02* (2006.01)
*G02B 17/00* (2006.01)

(52) U.S. Cl. .................. 362/326; 362/335; 359/708; 359/726; 359/737

(58) Field of Classification Search .............. 362/326, 362/335; 359/708–712, 737, 726
See application file for complete search history.

(56) References Cited

U.S. PATENT DOCUMENTS

| | | | | |
|---|---|---|---|---|
| 2,215,900 A | | 9/1940 | Bitner | |
| 2,224,178 A | | 12/1940 | Bitner | |
| 2,254,961 A | * | 9/1941 | Harris | 362/327 |
| 2,254,962 A | | 9/1941 | Harris | |
| 5,103,381 A | * | 4/1992 | Uke | 362/560 |
| 5,485,317 A | | 1/1996 | Perissinotto | |
| 5,757,557 A | * | 5/1998 | Medvedev et al. | 359/708 |
| 5,813,743 A | | 9/1998 | Naka | |
| 6,724,543 B1 | | 4/2004 | Chinniah | |
| 6,819,505 B1 | * | 11/2004 | Cassarly et al. | 359/726 |
| 6,896,381 B2 | | 5/2005 | Benitez | |
| 7,207,700 B2 | | 4/2007 | Fallahi | |
| 7,443,609 B2 | * | 10/2008 | Yoon et al. | 359/708 |
| 2002/0080615 A1 | | 6/2002 | Marshall | |
| 2004/0070855 A1 | | 4/2004 | Benitez | |
| 2005/0024744 A1 | | 2/2005 | Falicoff | |
| 2007/0086204 A1 | | 4/2007 | Chinniah | |

* cited by examiner

*Primary Examiner*—Stephen F Husar
*Assistant Examiner*—James W Cranson
(74) *Attorney, Agent, or Firm*—Brinks Hofer Gilson & Lione

(57) ABSTRACT

A lens for use with a light emitting source is provided. The lens has a main body with a light-collecting face and a light-emitting face and which defines an optical axis extending through the centers of these two faces. A pocket for receiving light from the light source is defined in the light-collecting face by an inner axially-facing surface surrounded by an inner radially-facing surface. The inner axially-facing surface is concave and has a spherical shape. The inner radially-facing surface has a non-spherical, tapered shape and extends between the axially-facing surface and an open end of the pocket. A light assembly incorporating the lens includes a light-emitting diode.

19 Claims, 3 Drawing Sheets

NEAR FIELD LENS

BACKGROUND

1. Field of the Invention

The present invention generally relates to lighting systems involving light pipes, and more particularly, to near field lenses that collect and direct light from light sources and send such light into light pipes.

2. Description of Related Art

Light-emitting diode (LED) light pipes are increasingly finding applications for automotive signal lamps because of their aesthetic look and signature differentiation between vehicle lines. Typical LED light pipes have diameters between five and twenty millimeters with vast variations in length. Styling themes demand light pipes having oddly curved shapes, which are optically challenging to design. This increase in shape complexity of the light pipes makes both the optical design and manufacturing of the light pipe very difficult. Light pipes that have complex shapes typically have lower optical efficiency and require high power LEDs to meet the Federal Motor Vehicle Safety Standards (FMVSS) beam pattern regulations.

Since most of the high powered LEDs emanate light in a nearly Lambertian pattern (radially along a hemisphere), and since the light pipe diameters are so small, the light entering the light pipe is typically only between 10-20% of the source light. This amount of light is insufficient for many designs.

Typical solutions to this problem are a reduction in the length of the light pipe, a reduction in the complexity of the light pipe, or additional light from the source. For example, very high powered LEDs or other light sources, such as mini halogen bulbs with elliptic reflectors, may be used in order to promulgate adequate light into the light pipe. Likewise, complex light delivery system using bulbs, reflectors, glass rods, and optical fibers may be used to try to promulgate adequate light into the light pipe. Furthermore, the LED light output may be increased via binning and advanced electronics.

However, if light pipe lengths or diameters need to be reduced, or if additional light needs to be added, cost and customer satisfaction may be impacted. Therefore, an optical device may be used to improve the amount of light entering the light pipe. The optical device, for example, a near-field lens, collects the light emitted by the LED source and sends it to the light pipe entrance. However, since many of the high powered LEDs come with optics (a "dome") above the chip with 5-8 mm diameters, it is difficult to design an optical device that will accommodate both the LED optic and a light pipe having a small diameter (5-10 mm).

In view of the above, it is apparent that there is a need to more efficiently utilize the source light from an LED or other light source having non-planar surface optics.

SUMMARY

In satisfying the above need, as well as overcoming the enumerated drawbacks and other limitations of the related art, the present invention provides a novel and non-obvious lens for use with a light emitting source. This lens includes a main body having a light-collecting face and a light-emitting face, with an optical axis extending through the centers of the light-collecting and the light-emitting faces. In order to receive light from the light source, a pocket is formed in the light-collecting face. The pocket is defined by an inner, axially-facing surface surrounded by an inner, radially-facing surface. The inner, axially-facing surface is concave and has a spherical shape, while the inner, radially-facing surface has a non-spherical, tapering shape and extends from the axially-facing surface in a direction away from the light-emitting surface.

In another aspect, a light assembly for use with a light pipe is provided. The light assembly has a lens, as described above, and further includes a light-emitting diode having a dome-shaped surface optic that is disposed within the pocket of the lens.

Further objects, features and advantages of this invention will become readily apparent to persons skilled in the art after a review of the following description, with reference to the drawings and claims that are appended to and form a part of this specification.

DETAILED DESCRIPTION

Figure 1:
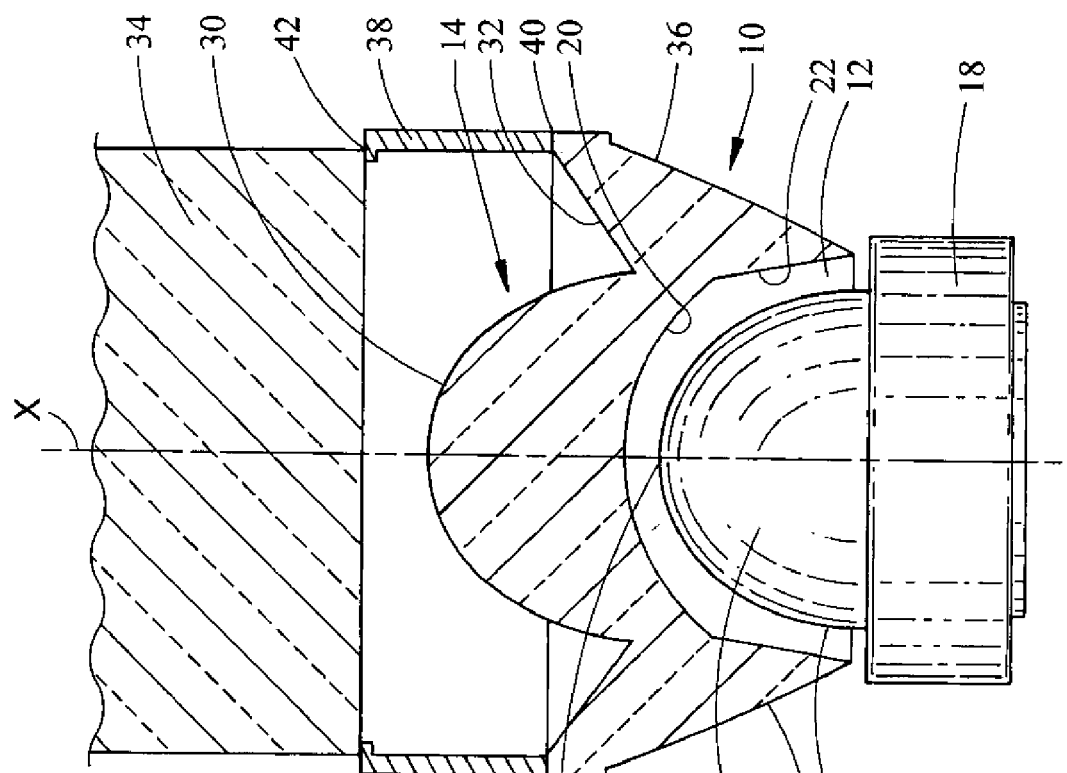
FIG. 1 is cross-sectional side view of a lens and light-emitting diode, along with a portion of a light pipe, embodying the principles of the present invention.
Figure 1A:
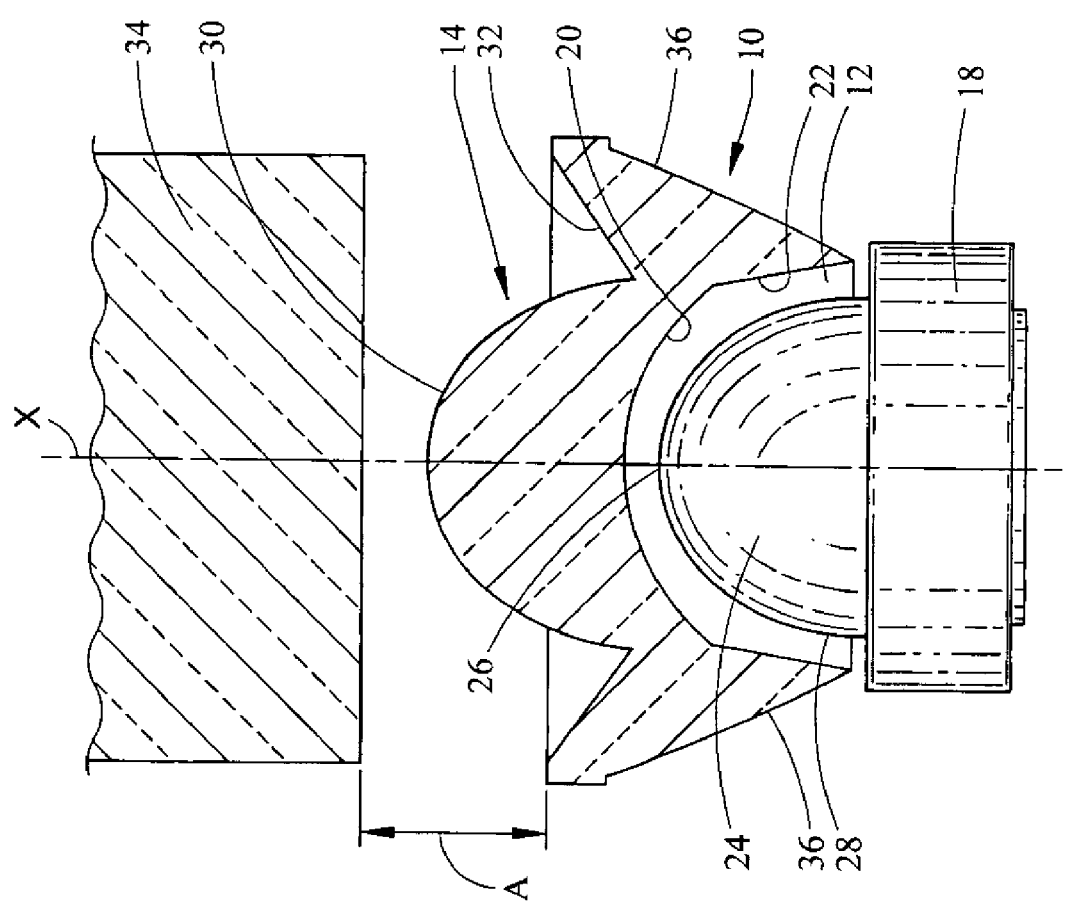
FIG. 1A is a cross-sectional side view similar to that of FIG. 1, and further including a cylindrical tube coupling the lens to the light pipe.
Figure 2:
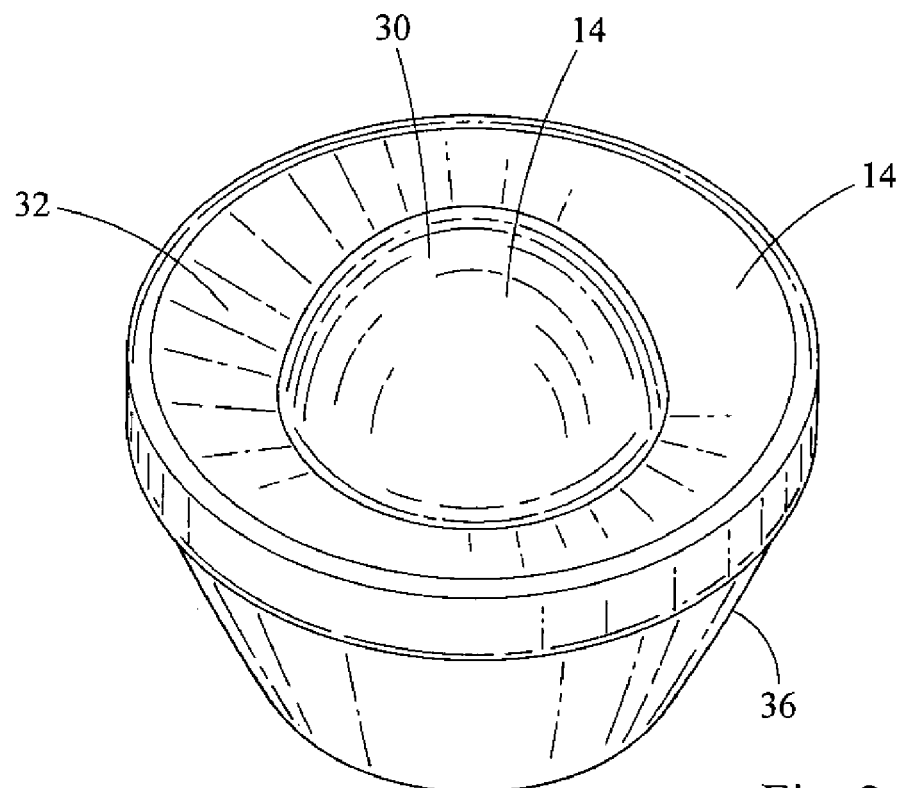
FIG. 2 is a perspective view of the lens utilized in FIGS. 1 and 1A.

Referring now to the drawings, a lens embodying the principles of the present invention is illustrated therein and designated at 10. The lens comprises a main body, which is made of a light-transmitting material, preferably, an optical grade plastic, such as polycarbonate or acrylic. The lens 10 may be created by any suitable method, including without limitation, by injection molding. The main body of the lens 10 has a light-collecting face 12 and a light-emitting face 14. An optical axis X extends through the main body of the lens, extending through the centers of the light-collecting face 12 and the light-emitting face 14.

The light-collecting face 14 defines a pocket in the body of the lens 10 for receiving light 16 from a light source 18, which is illustrated as a light-emitting diode (LED) in this embodiment and hereafter referenced as such. The light source 18 could alternatively be a Lambertian emitter, a $2\pi$ emitter, a fiber optic wire guide tip, or any other suitable light source.

The pocket is more specifically defined by an inner axially-facing surface 20 surrounded by an inner radially-facing surface 22. The inner axially-facing surface 20 is centered on the optical axis X, is concave and, has a hemispherical shape. This shape allows the inner axially-facing surface 20 to fit closely to the dome-shaped surface optic 24 of the LED 18. It is contemplated that the top edge 26 of the dome-shaped surface optic 24 of the LED 18 should be about 0.5 to about 2.0 millimeters away from the inner axially-facing surface 20, as measured along the optical axis X.

The inner radially-facing surface 22 has a non-spherical, tapering or conical shape, which extends from the axially-facing surface 20 in a direction away from the light-emitting surface 14. In other words, the radially-facing surface 22 extends between the axially-facing surface 20 and the open end of the pocket. The tapering shape of the inner radially-facing surface 22 is configured to allow the inner radially-facing surface 22 to fit closely to the dome-shaped surface optic 24 of the LED 18. It is contemplated that the side edge 28 of the dome-shaped surface optic 24 of the LED 18 should be about 0.5 to about 2.0 millimeters away from the inner radially-facing surface 22.

Because of the unique shape of the pocket of the lens 10, wherein both the inner axially-facing surface 20 and the inner radially-facing surface 22 fit closely to the edges 26, 28 of the surface optic 24 of the LED 18, a large portion of the light 16 emitted by the LED 18 will be collected by the lens 10.

The light-emitting face 14 of the lens 10 has a central section 30 and an outer section 32. The outer section 32 defines a conical, concave surface that radially surrounds the central section 30. The central section 30 is outwardly dome shaped and is radially centered on the optical axis X.

Figure 3:
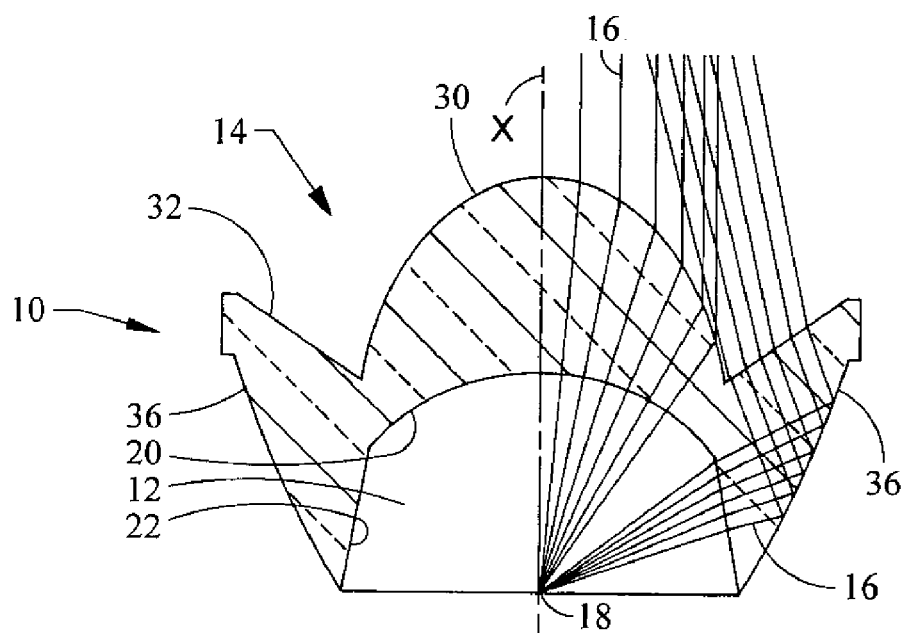
FIG. 3 is a cross-sectional side view of the lens of FIGS. 1, 1A and 2, showing light rays being directed therethrough.

With reference to FIG. 3, as light rays 16 are emitted from the LED 18 through the surface optic 24, the light rays 16 are collected by the light-collecting face 12. Some light rays 16 are collected by the inner axially-facing surface 20 and other light rays 16 are collected by the inner radially-facing surface 22.

The light rays 16 that are collected by the inner axially-facing surface 20 pass straight through the main body of the lens 10 until they reach the dome-shaped central section 30 of the light-emitting face 14. Upon reaching the dome-shaped central section 30, the light rays 16 are emitted out of the lens 10. The dome-shaped central section 30 collimates or nearly collimates the light rays 16 and emits the light rays 16 toward a light pipe 34.

The light rays 16 that are collected by the inner radially-facing surface 22 are refracted through the main body of the lens 10 until they reach a side surface 36 of the lens 10. Upon reaching the side surface 36, the light rays 16 are reflected via total internal reflection back through the main body of the lens 10 until they reach the outer section 32 of the light-emitting face 14, which refracts the light rays 16 toward the optical axis X of the lens 10.

Tangent lines to the surface of the outer section 32 are disposed at an angle with respect to the optical axis X that may be configured to partially or fully correct the direction of the light rays 16. The closer that the angle is to being perpendicular to the optical axis X, the more that the light rays 16 will be collimated, or nearly collimated and travel in a direction parallel to the optical axis X. If the angle is designed to be more acute with respect to the optical axis X, the light rays 16 will not be collimated, but instead will be directed toward the optical axis X, as shown in FIG. 3. Prism optics, or other surface optics, could further be used on the surface of the outer section 32 to reduce deviation from collimation, if desired.

In order to keep the size of the lens 10 small, it is preferable to configure the outer section 32 so that the light rays 16 are not collimated, but instead are directed toward the optical axis X, which will result in the light rays 16 being mostly directed into the light pipe 34. When the outer section 32 is angled enough to direct the light rays 16 toward the optical axis X, rather than to collimate the light rays 16, the resultant outer diameter of the outer section 32 of the lens 10 will be reduced, allowing the outer diameter of the outer section 32 to be nearly the same size as the light pipe 34. Only a portion of the light pipe 34 is shown in the drawings.

Typically light pipes 34 used in automotive applications have diameters between five and fifteen millimeters. In such applications, the light pipe 34 will extend along a length much longer than its width, and in some applications, the light pipe 34 may have curves in it.

In order to have an adequate amount of light intensity in parts of a curved light pipe 34 that are located farthest away from the light source, it is preferable to direct a substantial amount of light 16 into the curved light pipe 34. By keeping the diameter of the outer section 32 of the lens 10 about the same size as the diameter of the light pipe 34, most of the light 16 from the LED 18 will be directed into the light pipe 34. In other words, because the lens 10 does not have a diameter much larger than the diameter of the light pipe 34, the lens 10 directs a large percentage of the light rays 16 passing through it into the light pipe 34. It is contemplated that the outer diameter of the outer section 32 could be between five and twenty millimeters, depending on the size of the corresponding light pipe 34. It is also preferable that the outer diameter of the outer section 32 be between five and ten millimeters, in order to accommodate light pipes 34 having similar widths.

The light pipe 34 is preferably located a distance of about 2.0 millimeters from the lens 10, shown as dimension A in FIG. 1. In order to capture any light rays 16 that escape at the 2.0 millimeter gap, a cylindrical tube 38 extends between the lens 10 and the light pipe 34. A first end 40 of the cylindrical tube 38 is attached to the lens 10 and a second end 42 of the cylindrical tube 38 is attached to the light pipe 34. The cylindrical tube 38 is preferably provided with a reflective, metallic inner coating to reflect any light rays 16 that do come into contact with it toward the fight pipe 34.

Figure 4:
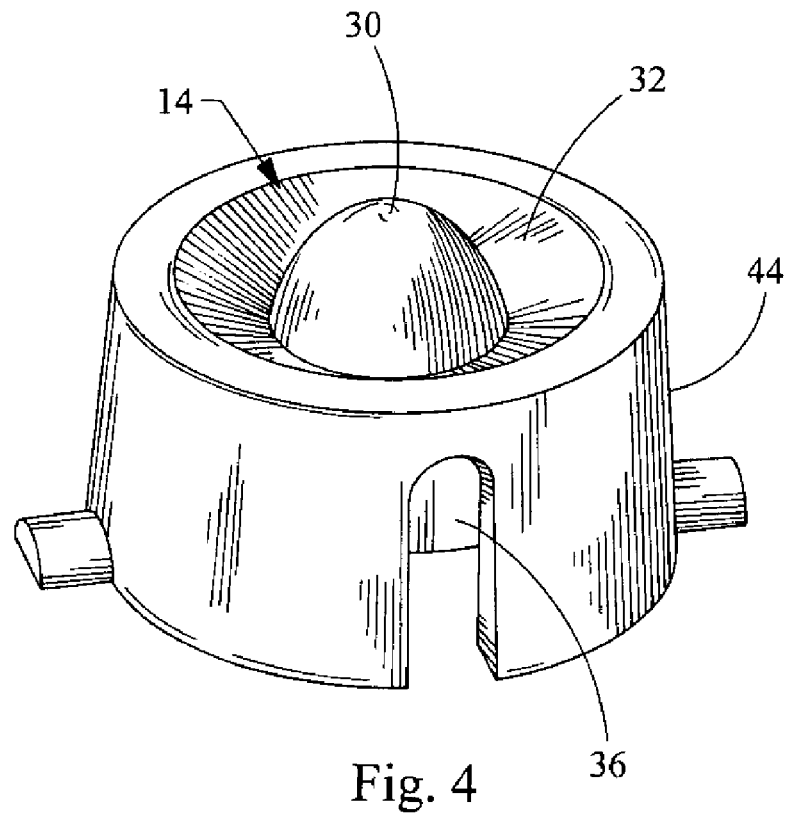
FIG. 4 is a perspective view of the lens of FIGS. 1, 1A, 2, and 3, having a connector attached to the lens.
Figure 5:
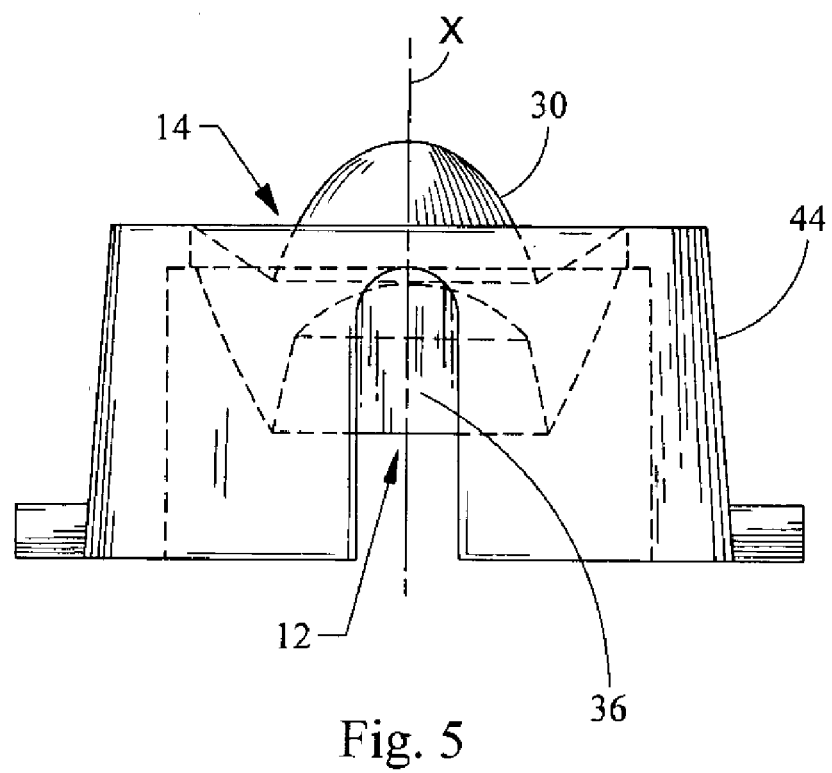
FIG. 5 is a side view of the lens and connector of FIG. 4.

With reference to FIGS. 4-5, a connector 44 may be formed with or connected to the outer section 32 of the lens 10. The connector 44 connects to the outer section 32 via a radial collar, and then extends in an axial direction, generally parallel to the optical axis X, toward the circuit board (not shown) that the LED 18 is connected to and/or supported on. The connector 44 holds the lens 10 around the LED 18, and connects the lens 10 directly to the LED circuit board (not shown) for support thereby.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A lens for use with a light emitting source, the lens comprising:

a main body having a light-collecting face and a light-emitting face, the main body defining an optical axis that extends through the centers of the light-collecting face and the light-emitting face;

a pocket in the main body defined by the light-collecting face for receiving light from the light source, the pocket being defined by an inner axially-facing surface surrounded by an inner radially-facing surface, the pocket having an open end, the inner axially-facing surface being concave and having a spherical shape;

the inner radially-facing surface having a conical shape and extending between the inner axially-facing surface and the open end of the pocket;

wherein the light-emitting face comprises a central section and an outer section, the outer section radially surrounding the central section and having a conical shape;

wherein the outer section generally defines a concave conical surface and is configured to direct light rays toward the optical axis.

2. A lens for use with a light emitting source, the lens comprising:

a main body having a light-collecting face and a light-emitting face, the main body defining an optical axis that extends through the centers of the light-collecting face and the light-emitting face;

a pocket in the main body defined by the light-collecting face for receiving light from the light source, the pocket being defined by an inner axially-facing surface surrounded by an inner radially-facing surface, the pocket having an open end, the inner axially-facing surface being concave and having a spherical shape;

the inner radially-facing surface having a conical shape and extending between the inner axially-facing surface and the open end of the pocket.

3. The lens of claim 2, wherein the light-emitting face comprises a central section and an outer section, the outer section radially surrounding the central section and having a conical shape.

4. The lens of claim 3, wherein the central section is dome shaped.

5. The lens of claim 3, further comprising a connector radially supporting the lens.

6. The lens of claim 3, wherein the lens has an effective outer diameter in the range of about five to twenty millimeters.

7. The lens of claim 3, wherein the lens has an effective outer diameter in the range of about five to ten millimeters.

8. lens of claim 2, wherein the light-emitting source is a light-emitting diode.

9. A light assembly comprising:
a lens having:
a main body with a light-collecting face and a light-emitting face, and defining an optical axis that extends through the centers of the light-collecting face and the light-emitting face;

a pocket formed in the light-collecting face, the pocket having an open end and being defined by an inner axially-facing surface surrounded by an inner radially-facing surface, the inner axially-facing surface being generally concave and having a hemispherical shape, the inner radially-facing surface having a conical shape and extending between the axially-facing surface and the open end of the pocket; and a light-emitting diode as a light source, the light-emitting diode having a dome-shaped surface optic being generally disposed within the pocket of the lens.

10. The light assembly of claim 9, wherein the light-emitting face of the lens comprises a central section and an outer section, the outer section radially surrounding the central section and having a conical shape.

11. The light assembly of claim 10, wherein the outer section is configured to direct light rays toward the optical axis.

12. The light assembly of claim 10, wherein the central section has a dome shape.

13. The light assembly of claim 10, further comprising a connector supporting the lens and being configured to connect the lens to a circuit board.

14. The light assembly of claim 10, wherein the lens has an outer diameter in the range of about five to about twenty millimeters.

15. The light assembly of claim 10, wherein the outer diameter is in the range of about five to about ten millimeters.

16. The light assembly of claim 9, wherein a portion of the dome-shaped surface optic of the light-emitting diode is positioned in the range of about 0.5 to about 2 millimeters from the inner axially-facing surface of the light-collecting face.

17. The light assembly of claim 16, wherein a portion of the dome-shaped surface optic of the light-emitting diode is positioned in the range of about 0.5 to about 2 millimeters from the inner radially-facing surface of the light-collecting face.

18. The light assembly of claim 9, further comprising a cylindrical tube having a first end attached to the lens, the cylindrical tube being configured to extend between the lens and a light pipe.

19. The light assembly of claim 18, wherein the cylindrical tube has a reflective inner surface.

* * * * *

UNITED STATES PATENT AND TRADEMARK OFFICE
CERTIFICATE OF CORRECTION

PATENT NO. : 7,618,160 B2  Page 1 of 1
APPLICATION NO. : 11/752801
DATED : November 17, 2009
INVENTOR(S) : Jeyachandrabose Chinniah et al.

It is certified that error appears in the above-identified patent and that said Letters Patent is hereby corrected as shown below:

In column 5, claim 8, line 27, before "lens of claim 2, wherein" insert --The--.

Signed and Sealed this

Twenty-sixth Day of October, 2010

David J. Kappos
*Director of the United States Patent and Trademark Office*